United States Patent
Wang et al.

(10) Patent No.: US 10,428,727 B2
(45) Date of Patent: Oct. 1, 2019

(54) BONDING STRENGTH ENHANCEMENT FOR CERAMIC COATING ON HIGH TEMPERATURE ALLOY

(71) Applicant: Ford Motor Company, Dearborn, MI (US)

(72) Inventors: Deren Wang, Beijing (CN); Harold Huimin Sun, West Bloomfield, MI (US); Xin Liu, Novi, MI (US); Douglas Allen Dobson, Ypsilanti, MI (US)

(73) Assignee: Ford Motor Company, Dearborn, MI (US)

( * ) Notice: Subject to any disclaimer, the term of this patent is extended or adjusted under 35 U.S.C. 154(b) by 56 days.

(21) Appl. No.: 15/487,739

(22) Filed: Apr. 14, 2017

(65) Prior Publication Data

US 2018/0298804 A1 Oct. 18, 2018

(51) Int. Cl.
| | | |
|---|---|---|
| *F02B 37/00* | (2006.01) | |
| *F01N 3/20* | (2006.01) | |
| *F01N 3/10* | (2006.01) | |
| *F02C 6/12* | (2006.01) | |
| *F01D 25/00* | (2006.01) | |
| *F01D 9/02* | (2006.01) | |
| *F01D 5/02* | (2006.01) | |
| *F01D 5/12* | (2006.01) | |
| *F01D 5/28* | (2006.01) | |

(52) U.S. Cl.
CPC ............ *F02B 37/00* (2013.01); *F01D 25/005* (2013.01); *F01N 3/103* (2013.01); *F01N 3/2066* (2013.01); *F02C 6/12* (2013.01); *F01D 5/02* (2013.01); *F01D 5/12* (2013.01); *F01D 5/288* (2013.01); *F01D 9/02* (2013.01); *F01N 2510/06* (2013.01); *F05D 2220/40* (2013.01); *F05D 2230/90* (2013.01); *F05D 2300/171* (2013.01); *F05D 2300/174* (2013.01); *F05D 2300/175* (2013.01); *F05D 2300/6033* (2013.01); *Y02T 10/144* (2013.01)

(58) Field of Classification Search
USPC ........................... 60/274, 280, 286, 300, 303
See application file for complete search history.

(56) References Cited

U.S. PATENT DOCUMENTS

| | | |
|---|---|---|
| 4,122,673 A | 10/1978 | Leins |
| 5,026,273 A | 6/1991 | Cornelison |
| 5,059,095 A | 10/1991 | Kushner et al. |

(Continued)

FOREIGN PATENT DOCUMENTS

| | | | | |
|---|---|---|---|---|
| EP | 1103298 | 5/2001 | | |
| GB | 2357120 | 6/2001 | | |
| KR | 20080054208 A | * 12/2006 | ............. | F02B 39/00 |

*Primary Examiner* — Binh Q Tran
(74) *Attorney, Agent, or Firm* — Burris Law, PLLC

(57) ABSTRACT

A system for increasing temperature in an exhaust aftertreatment system upstream of an exhaust aftertreatment device, such as a selective catalyst reduction (SCR) device, is provided. In one form, the system includes a component within an exhaust stream being exposed to exhaust flow and temperatures of at least 200° C. At least one surface of the component includes an adhered ceramic coating that functions as a catalyst to accelerate heating of the exhaust flow. In another form, a secondary catalyst is adhered to the ceramic coating. The component may be a part or parts of a turbocharger, such as nozzles, vanes, runners, and blades.

18 Claims, 5 Drawing Sheets

(56) References Cited

U.S. PATENT DOCUMENTS

| | | | |
|---|---|---|---|
| 5,355,668 A | | 10/1994 | Weil et al. |
| 5,404,721 A | * | 4/1995 | Hartsock ............... F01N 13/102 |
| | | | 60/300 |
| 5,743,013 A | | 4/1998 | Taylor et al. |
| 5,937,643 A | * | 8/1999 | Wang ..................... C23C 26/00 |
| | | | 427/239 |
| 6,001,436 A | * | 12/1999 | Strasser ................. C04B 35/80 |
| | | | 428/293.4 |
| 6,020,075 A | | 2/2000 | Gupta et al. |
| 6,298,660 B1 | * | 10/2001 | Daly ...................... F01N 13/10 |
| | | | 60/282 |
| 7,531,479 B2 | | 5/2009 | Burns et al. |
| 8,312,708 B2 | * | 11/2012 | Bennet ................... F01N 3/035 |
| | | | 60/280 |
| 2002/0078934 A1 | * | 6/2002 | Hohkita ................ F01N 3/2006 |
| | | | 123/564 |
| 2008/0236149 A1 | * | 10/2008 | Kyle ...................... F01D 5/048 |
| | | | 60/299 |
| 2011/0252775 A1 | * | 10/2011 | Joergl ................... F01D 25/145 |
| | | | 60/321 |
| 2015/0047348 A1 | * | 2/2015 | Osumi ................... F01N 3/103 |
| | | | 60/605.2 |

\* cited by examiner

BONDING STRENGTH ENHANCEMENT FOR CERAMIC COATING ON HIGH TEMPERATURE ALLOY

FIELD

The present disclosure relates to exhaust aftertreatment systems, for example those used in diesel engine exhausts, and more specifically to improved performance of catalysts in reducing harmful emissions from the exhaust.

BACKGROUND

The statements in this section merely provide background information related to the present disclosure and may not constitute prior art.

During operation of a motor vehicle, emissions are generated that are treated in an exhaust aftertreatment system in order to reduce harmful pollutants. These pollutants include uncombusted hydrocarbons (HC), carbon monoxide (CO), oxides of nitrogen (NOx), and particulate matter (PM), among others. Treatment of the exhaust gas typically includes a catalyst, such as an SCR (selective catalyst reduction) catalyst, which converts or removes the pollutants contained in the exhaust gas.

During the first few minutes after engine start-up, or during a "cold start," the engine block and coolant temperatures are low. Accordingly, the exhaust gas is at a lower temperature, which reduces the efficiency of the catalyst compared to steady-state operation at higher temperatures.

Furthermore, modern heavy duty engines are typically turbocharged. As exhaust gas passes through the turbocharger, the exhaust gas temperature decreases due to thermal energy being extracted to a compressor and to warm up the turbine housing. This decrease in temperature delays the light-off of downstream oxidation catalysts and SCR (selective catalyst reduction) catalysts during a cold start. In some cases, approximately 90% gaseous emissions escape to a tailpipe before the downstream catalysts are warmed-up and functioning.

These cold start issues in exhaust aftertreatment systems are addressed by the present disclosure.

SUMMARY

In one form of the present disclosure, a system for increasing temperature in an exhaust aftertreatment system upstream of an exhaust aftertreatment device, such as a selective catalyst reduction (SCR) device, is provided. The system comprises a component within an exhaust stream being exposed to exhaust flow and temperatures of at least 200° C., wherein at least one surface of the component comprises an adhered ceramic coating that functions as a catalyst to accelerate heating of the exhaust flow proximate the component. Further, a secondary catalyst may be adhered to the ceramic coating. In variations of this form, the secondary catalyst may be impregnated within the ceramic coating. The secondary catalyst may be at least one rare earth metal and may be selected from the group consisting of an oxidation catalyst and a selective catalytic reduction (SCR) catalyst, and combinations thereof, coated onto the ceramic coating. The ceramic coating in one form is a material selected from the group consisting of alumina, silica, titania, zirconia, cerium zirconium oxide, and combinations thereof, in which the ceramic coating may further include at least one rare earth stabilizer. The rare earth stabilizer may be selected from the group consisting of lanthanum oxide and ceria, and combinations thereof.

In one form, the ceramic coating is adhered by a deposition process. The deposition process in one form is a cathode plasma electrodeposition (CPED) process having a pulse voltage between 100V-2,000V and a frequency between 50 Hz-2,000 Hz. In another form, the deposition process is selected from the group consisting of thermal spray, plasma spray, thin film, thick film, and sol-gel.

Further still, at least one of the ceramic coating and the secondary catalyst are further adhered to the component by heat treating. The component may also comprise an oxidation layer that is exposed to the ceramic coating prior to the deposition process, which may be formed using a heat treatment process.

In another form of the present disclosure, a turbocharger for increasing temperature in an exhaust aftertreatment system upstream of an exhaust aftertreatment device is provided. The turbocharger is configured to be disposed within the exhaust stream and exposed to exhaust flow and temperatures of at least 200° C., wherein at least one surface of a component of the turbocharger comprises an adhered ceramic coating and a secondary catalyst that function as a catalyst to accelerate heating of the exhaust stream proximate the turbocharger. The turbocharger component may include, by way of example, nozzles, vanes, runners, and blades, and combinations thereof. In one form, the component of the turbocharger is a metallic material is selected from the group consisting of a Ni super alloy, a TiAl alloy, ceramic matrix composites, and stainless steel.

In still another form, an exhaust aftertreatment system is provided. The exhaust aftertreatment system includes a component upstream of an exhaust aftertreatment device, the component being disposed within an exhaust stream of the exhaust aftertreatment system and being exposed to exhaust flow and temperatures of at least 200° C., wherein at least one surface of the component comprises an adhered ceramic coating that functions as a catalyst to accelerate heating of the exhaust stream proximate the component.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
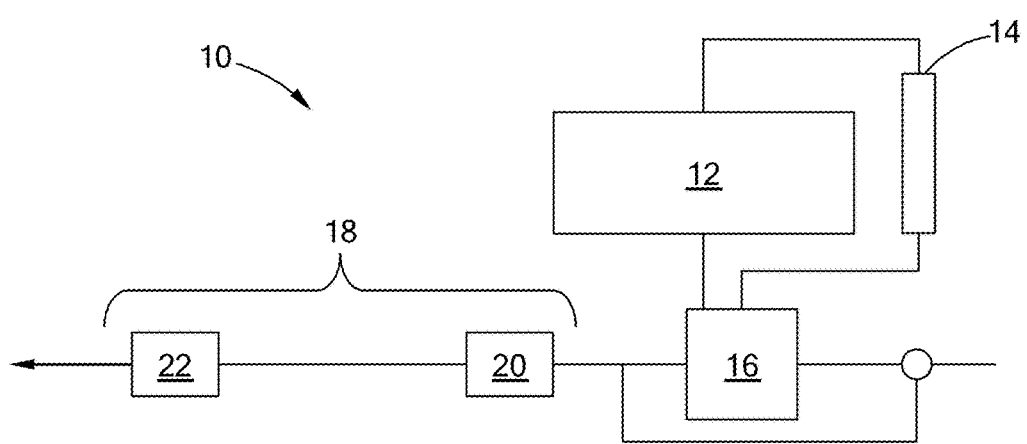
FIG. 1 is a schematic view of an exhaust aftertreatment system in which the principles of the present disclosure are applied.

The following description is merely exemplary in nature and is not intended to limit the present disclosure, application, or uses. It should be understood that throughout the drawings, corresponding reference numerals indicate like or corresponding parts and features.

Referring to FIG. 1, an exemplary power system is illustrated and generally indicated by reference numeral 10. The power system 10 generally includes an engine 12, an intercooler 14, a turbocharger 16, and an exhaust aftertreatment system 18. The exhaust aftertreatment system 18 is disposed downstream from the turbocharger 16 and treats post-combustion exhaust gases to reduce emissions from being released into the atmosphere. Typically, the exhaust aftertreatment system 18 includes aftertreatment devices such as a diesel oxidation catalyst (DOC) 20 and a selective catalytic reduction device (SCR) 22, among other components not shown.

It should be understood the exhaust aftertreatment system 18 is merely exemplary, and thus other aftertreatment components such as a diesel particulate filter (DPF), NOx absorber, an ammonia oxidation catalyst, among others, may be included, while other components such as the DOC 20 and SCR 22 may not be employed. Further, although an exhaust system for a diesel engine is shown, it should be understood that the teachings of the present disclosure are also applicable to gasoline engine exhaust systems, among other power and exhaust producing devices such as a genset. Therefore, the power system 10 for a diesel engine should not be construed as limiting the scope of the present disclosure.

Figure 2:
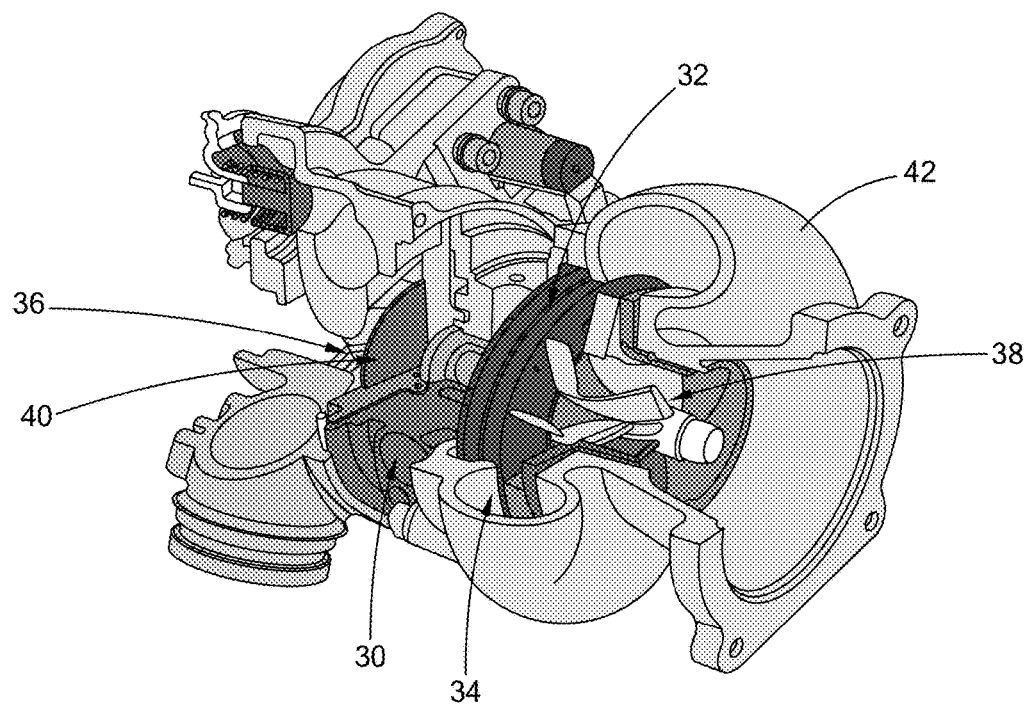
FIG. 2 is a perspective partial cutaway view of a turbocharger employed according to the teachings of the present disclosure.

Referring now to FIG. 2, the turbocharger 16 generally includes components such as a nozzle 30, vanes 32, a runner 34 leading into the turbocharger 16, and blades 36/38 (compressor blades 36 and turbine blades 38), among other components. It should be understood that the turbocharger 16 illustrated in this figure is merely exemplary and its construction and components should not be construed as limiting the scope of the present disclosure. For example, the illustrated nozzle 30 is merely an example, and the turbocharger 16 may include other nozzles connected to runners that are not illustrated in this figure. Therefore, the teachings of the present disclosure may be applied to any or a combination of components of a turbocharger while remaining within the scope of the present disclosure.

As set forth above, the turbocharger 16 is disposed upstream of the exhaust aftertreatment system 18 and the aftertreatment device(s). As such, temperatures of the exhaust gas actually decrease when passing through the turbocharger 16 due to the thermal energy that is extracted to drive the compressor 40 and to warm the turbine housing 42. This is especially evident during a "cold start" before the engine 12 is warmed-up.

Figure 3:
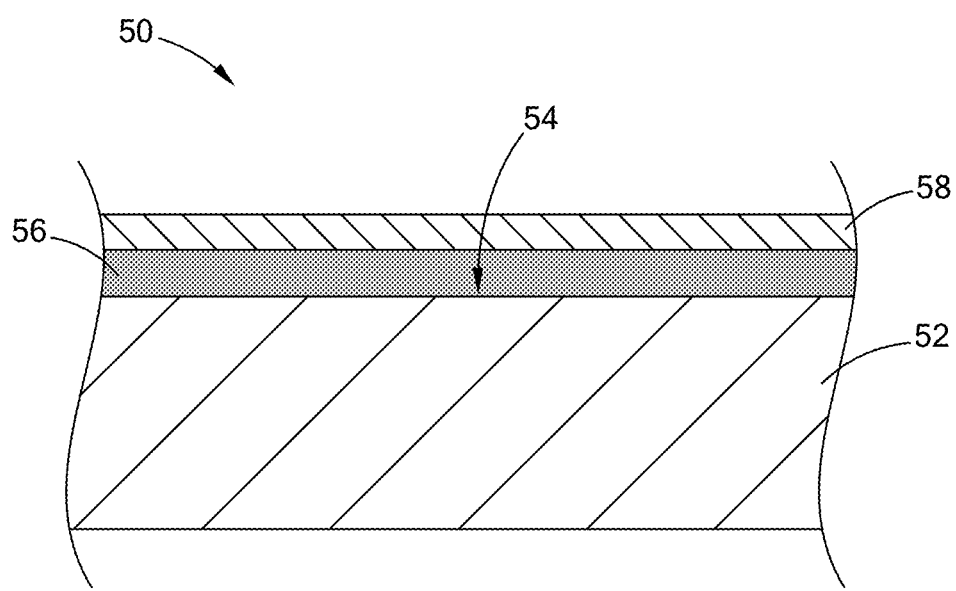
FIG. 3 is a partial cross-sectional view of a component having an adhered ceramic coating and a secondary catalyst according to the teachings of the present disclosure.

Referring to FIG. 3, a system for increasing temperature in the exhaust aftertreatment system 18 upstream of the exhaust aftertreatment devices (e.g., DOC 20, SCR 22) is illustrated and generally indicated by reference numeral 50. The system 50 includes at least one component 52, such as a component of a turbocharger 16 as set forth above, disposed within an exhaust stream and upstream of the exhaust aftertreatment device(s). As shown, at least one surface 54 of the component 52 comprises an adhered ceramic coating 56 that functions as an oxidation catalyst to accelerate heating of the exhaust flow proximate the component 52. In order for the adhered ceramic coating 56 to begin oxidizing and increase exhaust gas temperatures, the component 52 is exposed to the exhaust flow and temperatures of at least 200° C.

As used herein, the term "adhered" should be construed to mean a molecular attachment or mechanical bonding of the ceramic coating 56 to the surface 54 of the component 52 such that the ceramic coating 56 can withstand the thermal and mechanical environment upstream of the exhaust aftertreatment devices, such as moving parts of the turbocharger 16, e.g., the turbine blades 38. Also, since the turbocharger 16 components are often made of a high temperature resistant materials, the ceramic coating 56 is formulated to be adhered to these high temperature materials as well. As used herein, the term "high temperature" should be construed to be a temperature of at least about 800° C. Such high temperature materials may include but are not limited to nickel super alloys, a titanium-aluminum alloys, ceramic matrix composites, and stainless steel, among others.

The formulation of the ceramic coating 56 may include high surface area ceramics selected from the group consisting of alumina, silica, titania, zirconia, cerium zirconium oxide, and combinations thereof. In one variation, the ceramic coating 56 may further include a rare-earth stabilizer selected from the group consisting of lanthanum oxide and ceria, and combinations thereof. The rare earth stabilizers provide stronger adhesion with high temperature metallic materials as set forth above.

As further shown, the component 52 may further comprise a secondary catalyst 58 adhered to the ceramic coating 56 to further improve oxidation and temperature increases. In one variation, the secondary catalyst 58 is impregnated within the ceramic coating 56 rather than being deposited/applied over the ceramic coating 56 as shown. The secondary catalyst 58 may be a base metal or a precious metal, either individually or in combination. The secondary catalyst 58 may be stabilized with a rare-earth metal. The secondary catalyst 58 may be a catalyst selected from the group consisting of an oxidation catalyst and an SCR catalyst, and combinations thereof, coated onto the ceramic coating 56.

Adhesion of the ceramic coating 56 to the component 52 may be accomplished by a deposition process, such as cathode plasma electrodeposition (CPED) process having a voltage between 100V-2,000V and a frequency between 50 Hz-2,000 Hz to ensure proper porosity and morphology of the ceramic coating 56. This deposition process is merely exemplary, and thus other deposition processes may be employed, such as by way of example, thermal spray, plasma spray, thin film, thick film, and sol-gel processes, among others. Accordingly, the CPED process is merely exemplary and should not be construed as limiting the scope of the present disclosure.

Adhesion of the ceramic coating 56 and/or the secondary catalyst 58 to the component 52 may be further enhanced by heat treating processes. For example, after heat treating the ceramic coating 56 at 400° C.-800° C. for a time period between 0.5 hours-10 hours, an alumina layer, with or without rare earth dopants, coated on a nickel alloy using CPED technique showed a bonding strength up to 30-40 MPa, one or two times higher than that of the untreated coating layers. Further, the component 52 itself may be heat treated, or treated in another manner (e.g., salt bath) in order to form an oxidation layer that is exposed to the ceramic coating 56, prior to deposition of the ceramic coating 56 and the secondary catalyst 58. Such treatment processes, whether applied individually or in combination to the component 52, ceramic coating 56, and secondary catalyst 58 generally serve to oxidize the materials and improve their adhesion to one another.

Although continuous layers of the ceramic coating 56 and the secondary catalyst 58 are illustrated, it should be understood that these materials may be applied either continuously, discontinuously, or in a predetermined pattern while remaining within the scope of the present disclosure. Therefore, the continuous layers shown herein should not be construed as limiting the scope of the present disclosure.

Generally, a component 52 having the ceramic coating 56 and optional secondary catalyst 58 is operable to increase the temperature of the exhaust aftertreatment system 16 upstream of an exhaust aftertreatment device such as the SCR 22 to improve its efficiency. When the ceramic coating 56 is disposed on a component of the turbocharger 16, for example on the compressor blades 36, the turbine blades 38 and/or other components, temperature is increased due to oxidation of the ceramic coating 56 and the secondary catalyst 58, which allows for faster warm-up and higher temperatures to improve efficiency of the downstream exhaust aftertreatment device(s).

Figure 4:
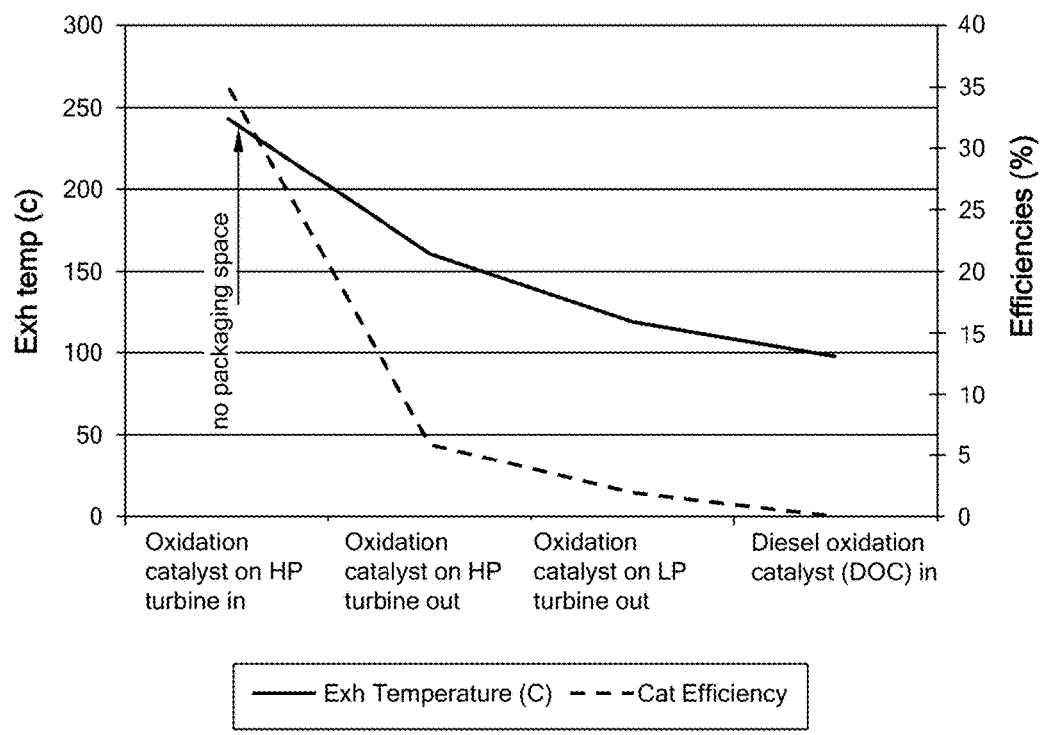
FIG. 4 is a chart of exhaust gas temperature versus oxidation catalyst efficiency according to the principles of the present disclosure.

This beneficial effect is illustrated in FIG. 4, where temperature distribution and respective oxidation catalyst efficiencies (e.g., coated oxidation catalyst on turbine blades 38 and the DOC) along an exhaust stream of the turbocharger 16 are shown. At higher exhaust temperatures, the oxidation catalyst efficiency is higher. More specifically, when the exhaust temperature is low at the DOC inlet, the DOC efficiency is low. As the exhaust gas travels through the turbocharger 16, which is a two-stage turbocharger in this form, and the exhaust gas temperature increases, the DOC efficiency increases. Therefore, by applying the teachings of the present disclosure, the oxidation catalyst (i.e., ceramic coating 56, ceramic coating 56 and secondary catalyst 58) is in a more beneficial location for faster light off, therefore increasing exhaust temperature at a higher rate.

Figure 5:
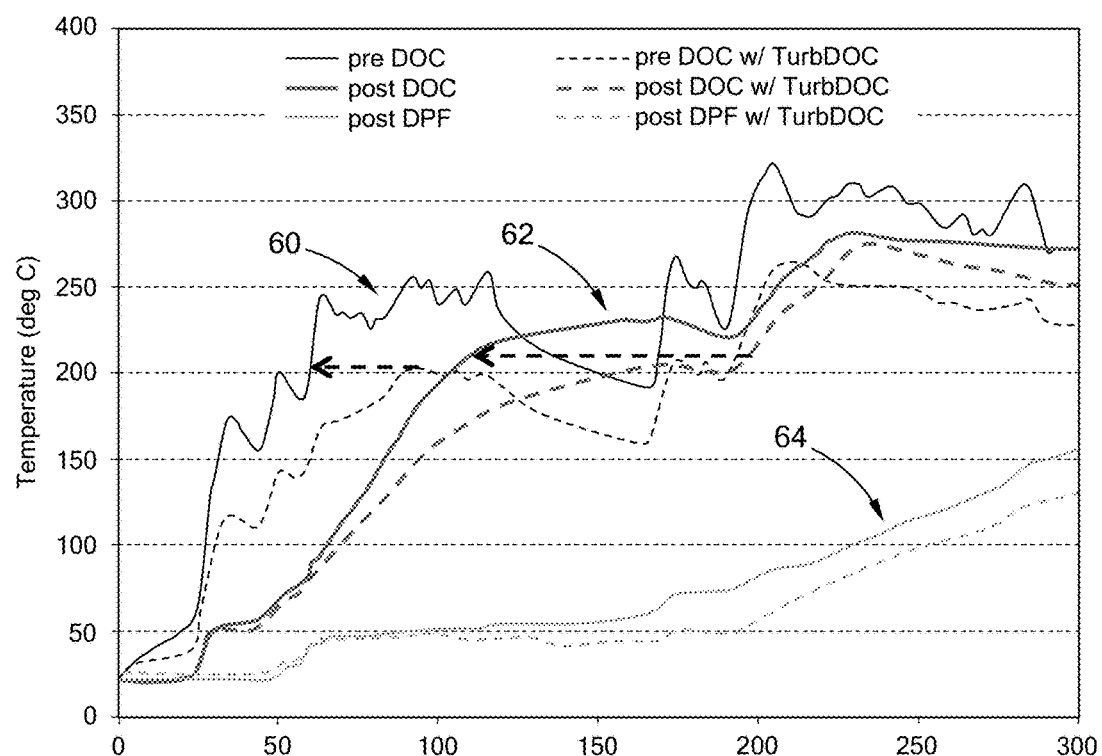
FIG. 5 is a chart illustrating the increased temperatures achieved at various locations within an exhaust aftertreatment system using the teachings of the present disclosure.

This improvement has further been demonstrated in testing as illustrated in FIG. 5. As shown, the temperature increase over time by using the innovative ceramic coating 56 (and optionally the secondary catalyst 58) according to the present disclosure is demonstrated upstream of the DOC 60, downstream of the DOC 62, and downstream of a DPF 64. Temperature increases are evident from this testing, in which stronger heat and mass transfer within the turbocharger housing 42 can accelerate the oxidation catalyst efficiency from approximately 0-5% to 20-30% during the warm-up period of a cold start. Furthermore, acceleration of the warm-up of the downstream exhaust aftertreatment devices, such as the SCR 22 catalyst occurs as a result of the exothermic energy from the catalyst reaction of the ceramic coating 56, and optional secondary catalyst 58. Use of a downstream diesel oxidation catalyst (DOC) device in combination with the ceramic coating 56 and optional secondary catalyst 58 may further improve the efficiency of the exhaust aftertreatment devices.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for increasing temperature in an exhaust aftertreatment system, the system comprising:
   a turbocharger with a component within an exhaust stream being exposed to exhaust flow and temperatures of at least 200° C.;
   an exhaust aftertreatment system downstream from the turbocharger; and
   a ceramic coating adhered to at least one surface of the component and functions as a catalyst to accelerate heating of the exhaust flow proximate the component upstream from the exhaust aftertreatment system, wherein the ceramic coating is adhered to the at least one surface by a cathode plasma electrodeposition (CPED) process having a pulse voltage between 100V-2,000V and a frequency between 50 Hz-2,000 Hz.

2. The system according to claim 1 further comprising a secondary catalyst adhered to the ceramic coating.

3. The system according to claim 2, wherein the secondary catalyst is impregnated within the ceramic coating.

4. The system according to claim 3, wherein the secondary catalyst is at least one rare earth metal.

5. The system according to claim 2, wherein the secondary catalyst is selected from the group consisting of an oxidation catalyst and a selective catalytic reduction (SCR) catalyst, and combinations thereof, coated onto the ceramic coating.

6. The system according to claim 1, wherein the ceramic coating is a material selected from the group consisting of alumina, silica, titania, zirconia, cerium zirconium oxide, and combinations thereof.

7. The system according to claim 6, wherein the ceramic coating includes at least one rare earth stabilizer.

8. The system according to claim 7, wherein the rare earth stabilizer is selected from the group consisting of lanthanum oxide and ceria, and combinations thereof.

9. The system according to claim 1, wherein the adhered ceramic coating has a bonding strength of at least 30 MPa.

10. The system according to claim 9, wherein at least one of the ceramic coating and the secondary catalyst are further adhered by heat treating.

11. The system according to claim 9, wherein the component further comprises an oxidation layer that is exposed to the ceramic coating prior to the deposition process.

12. A turbocharger for increasing temperature in an exhaust aftertreatment system upstream of an exhaust aftertreatment system, the turbocharger configured to be disposed within an exhaust stream and exposed to exhaust flow and temperatures of at least 200° C., the turbocharger comprising:
   at least one component with a surface comprising an adhered ceramic coating that functions as a primary catalyst to accelerate heating of the exhaust stream proximate the surface and upstream of the exhaust aftertreatment system, wherein the ceramic coating is adhered to the at least one surface by a cathode plasma electrodeposition (CPED) process having a pulse voltage between 100V-2,000V and a frequency between 50 Hz-2,000 Hz, has a second catalyst adhered thereto and has a bonding strength or at least 30 MPa; and
   the exhaust aftertreatment system comprising at least one exhaust aftertreatment device.

13. The turbocharger according to claim 12, wherein the at least one component is selected from the group consisting of nozzles, vanes, runners, and blades, and combinations thereof.

14. The turbocharger according to claim 12, wherein the ceramic coating and the secondary catalyst are further adhered by heat treating the turbocharger component at least one of before and after the adhered ceramic component and the secondary catalyst are applied.

15. The turbocharger according to claim 12, wherein the at least one component of the turbocharger is a metallic material is selected from the group consisting of a Ni super alloy, a TiAl alloy, ceramic matrix composites, and stainless steel.

16. A power system comprising:
    an engine;
    a turbocharger comprising a component disposed within an exhaust stream of the engine and being exposed to exhaust flow and temperatures of at least 200° C., wherein at least one surface of the component comprises an oxide layer and a ceramic coating that functions as a primary catalyst to accelerate heating of the exhaust stream proximate the component adhered to the oxidation layer; and
    at least one aftertreatment system downstream of the turbocharger.

17. The exhaust aftertreatment system according to claim 16 further comprising a secondary catalyst adhered to the ceramic coating.

18. The exhaust aftertreatment system according to claim 17, wherein at least one of the ceramic coating and the secondary catalyst are further adhered by heat treating the component at least one of before and after the adhered ceramic component and the secondary catalyst are applied.

\* \* \* \* \*